(12) United States Patent
Paretti

(10) Patent No.: US 11,859,398 B2
(45) Date of Patent: Jan. 2, 2024

(54) DEVICE FOR EMERGENCY DEPLOYMENT OF A POST OFFICE

(71) Applicant: Joe Paretti, Kenner, LA (US)

(72) Inventor: Joe Paretti, Kenner, LA (US)

(*) Notice: Subject to any disclaimer, the term of this patent is extended or adjusted under 35 U.S.C. 154(b) by 281 days.

(21) Appl. No.: 17/390,838

(22) Filed: Jul. 30, 2021

(65) Prior Publication Data
US 2023/0030774 A1    Feb. 2, 2023

(51) Int. Cl.
| | | |
|---|---|---|
| *E04H 1/12* | (2006.01) | |
| *A47G 29/12* | (2006.01) | |
| *E05B 67/06* | (2006.01) | |
| *F24F 5/00* | (2006.01) | |
| *E04H 3/00* | (2006.01) | |
| *E04H 1/06* | (2006.01) | |

(52) U.S. Cl.
CPC ....... *E04H 1/1205* (2013.01); *A47G 29/1218* (2013.01); *E04H 1/06* (2013.01); *E04H 1/12* (2013.01); *E04H 3/00* (2013.01); *E05B 67/06* (2013.01); *F24F 5/0046* (2013.01); *E04H 2001/1283* (2013.01)

(58) Field of Classification Search
CPC ........... E04H 1/12; E04H 1/1205; E04H 1/06; E04H 3/00; E04H 2001/1283; A47G 29/1218; E05B 67/06; F24F 5/0046
See application file for complete search history.

(56) References Cited

U.S. PATENT DOCUMENTS

| | | | | |
|---|---|---|---|---|
| 4,509,676 A | * | 4/1985 | Stacy | A47G 29/1218 |
| | | | | 232/27 |
| 4,651,921 A | * | 3/1987 | McKellar | A47G 29/1218 |
| | | | | 232/43.4 |
| 10,428,540 B1 | * | 10/2019 | Werner | E04H 3/02 |
| 2021/0196069 A1 | * | 7/2021 | Likins | A47G 29/1218 |
| 2021/0254357 A1 | * | 8/2021 | Werner | E04B 1/3444 |

FOREIGN PATENT DOCUMENTS

| | | | | | |
|---|---|---|---|---|---|
| AT | 317764 B | * | 9/1974 | | A47G 29/1218 |
| CA | 2138854 A1 | * | 6/1996 | | E04H 1/1205 |
| CN | 107126067 A | * | 9/2017 | | A47G 29/1218 |
| CN | 108065737 A | * | 5/2018 | | A47G 29/1218 |
| CN | 112512944 A | * | 3/2021 | | B65G 1/0492 |
| DE | 29607418 U1 | * | 8/1996 | | A47B 53/02 |
| DE | 202013002516 U1 | * | 6/2013 | | E04B 1/3448 |
| DE | 102018112732 A1 | * | 11/2019 | | E04H 1/1205 |
| FR | 2898793 A1 | * | 9/2007 | | A47G 29/1218 |
| WO | WO-2014169320 A1 | * | 10/2014 | | E04B 1/34336 |

* cited by examiner

*Primary Examiner* — Michael Safavi
(74) *Attorney, Agent, or Firm* — David M. Stein

(57) ABSTRACT

A portable post office contained within an intermodal container is disclosed. Such a structure may include a rack movably secured to a track mounted in the ceiling of said container via a trolley. The rack may be configured to hold a plurality of post office boxes, each box having a lockable door facing the center aisle of the container, and an open end facing the rear of the rack. The rack may be positioned against an interior side wall of the container and secured in place via a locking mechanism to prevent access to the open ends of the post office boxes. An individual may release the locking mechanism and move the rack into the center aisle along the track to access the open ends of the post office boxes. The rack member may then be moved back along the track and re-secured against the side wall.

16 Claims, 15 Drawing Sheets

DEVICE FOR EMERGENCY DEPLOYMENT OF A POST OFFICE

FIELD OF THE INVENTION

The present invention is generally related to postal services, and, more particularly, to a portable post office for the purpose of providing post office boxes, and thus postal services, to either remote areas or areas where regular postal services have been interrupted, such as due to natural disasters.

CROSS-REFERENCES TO RELATED INVENTIONS

Not applicable.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

Generally, postal services involve the delivery of mail and packages either directly to a residential or commercial address, or to "post office boxes" ("p.o. boxes") located inside a regional post office. In the latter case, users may rent a p.o. box at a post office, to which their mail is delivered. Said p.o. boxes are accessible to their users via a lockable door in the front of the box accessed via an area of a postal facility open to the general public, with each user having a key or other such means for unlocking their assigned p.o. box. Mail is delivered to each p.o. box via an unlocked door or opening in the rear of each box. These unsecured sides of the p.o. boxes face a locked or otherwise secured room or area accessible only to certain authorized individuals, such as postal workers. Thus, while certain authorized individuals may access the unsecured sides of the p.o. boxes for the purpose of delivering mail, individual users can only access their specific p.o. box via the lockable front door.

In certain circumstances, such as in an area where a natural disaster has damaged or destroyed a local postal facility and/or commercial/residential delivery addresses, it is desirable to provide a temporary structure for providing postal services, including p.o. boxes, until the ordinary means for mail delivery in said area can be restored. Currently, such temporary structures are typically deployed in the form of a "double-wide" trailer. Such structures are usually deployed either near a destroyed or damaged postal facility, or strategically placed near an area where postal services to several commercial or residential addresses have been interrupted. However, the use of such structures presents significant drawbacks.

Typical double-wide trailers currently used to deploy temporary post offices are usually 24 feet wide and 64 feet long and, due to their size, must be delivered to the deployment site as two separate units which much then be joined together on site. Thus, not only do such structures require two trucks (one for each unit) for delivery, but they also require extra time and manpower to join the two units together. Moreover, the flooring of most double-wide trailers is approximately two to three feet off the ground, requiring the additional construction of a landing, stairs, and accessibility ramp once the trailer is in place. Such accessibility ramps can require significant time for construction and space for installation, as must building standards require 12 feet of ramp length for each foot of horizontal drop. Thus, a double-wide wherein the flooring is 3 feet above ground level would require a 36-foot accessibility ramp and level rest-area landings.

Accordingly, deployment of a double-wide trailer for use as a temporary postal facility can take a week or more to set up. Moreover, at the end of the deployment, the stairs and other accessibility structures must be disassembled and, typically being made of lumber, are usually discarded. The structure must further be broken back down into two units for transportation away from the deployment site. Finally, the exteriors of most currently-available double-wide trailers deployed as postal facilities are typically made from inexpensive materials—such as vinyl or aluminum siding—that are prone to damage, thereby requiring costly repairs during or after each deployment. Currently available trailers are also subject to termite damage during storage, which may require further repair costs and could delay deployment if not discovered until the structure is needed. It is therefore desirable to provide a durable, portable post office structure entirely contained within a single unit—such as an intermodal container—that can be rapidly transported and deployed with little to no post-delivery construction required.

Intermodal containers, also known as shipping containers, cargo or freight containers, or ISO containers, are typically configured as rectangular cuboids that are 8 feet wide, 20 feet long, and 8.5 feet tall, though other sizes are possible. For example, some intermodal containers may be up to 8 feet wide, up to 56 feet long, and up to 9.5 feet tall. Though many configurations and structural materials are possible, such intermodal containers typically have a rectangular, closed-box configuration, with doors fitted at one end, and are typically made of corrugated steel with a plywood interior floor. The corrugated steel exterior of such containers is more durable than the typical external materials used in the construction of double-wide trailers. Further, due to their size (particularly the 8'×20'×8.5' containers), most intermodal containers can be transported by a single flatbed truck, though they may also easily be transported via rail or barge, should longer range transportation be required. Finally, since the interior flooring of most intermodal containers is about 6 inches above ground level, any accompanying accessibility structures for entry into the interior of such a container would be smaller than corresponding structures necessary for a double-wide trailer.

SUMMARY OF THE INVENTION

Due to the inefficiencies inherent with currently-available structures for deployment as temporary post offices, such as the requirement that the structure be towed to the desired location as two units to be joined together, as well as additional labor and construction required for accessibility structures, it is therefore an object of the present invention to provide a portable, durable, temporary post office that can be rapidly deployed as a single unit to a disaster-stricken area such that interruption of postal services to said area can be resumed with minimal delay. More specifically, it is an object of the present invention to provide a self-contained, portable post-office contained within an intermodal container.

According to an exemplary embodiment of the present invention, a portable post office may comprise a portable container, such as a corrugated steel intermodal container having a set of corrugated steel doors fitted at one end, a track member mounted to the ceiling of the interior of the container and running perpendicular to the side walls of the container, a rack member movably secured to the track member via a trolley, and a locking mechanism configured to secure the rack member against a side wall of the container. The rack member may be configured to hold a plurality of p.o. boxes, each having a lockable door facing the center of the container and an open end opposite said lockable door. The rack member may be further configured to move along the track member such that the rack member may be positioned against a side wall of the container and locked in place with the locking mechanism, thereby preventing unauthorized access to the open sides of the p.o. boxes, while allowing users to access the lockable doors of the p.o. boxes via the center of the container. When mail is to be delivered to the p.o. boxes, an authorized individual, such as a postal worker, may unlock the locking mechanism, thereby releasing the rack member from the side wall. The rack member may then be moved along the track member into the center of the container, thereby allowing said authorized individual to access the open ends of the p.o. boxes, into which mail and/or packages may be delivered. The rack member may then be returned to its original position against the side wall and locked back into place via the locking mechanism.

Certain embodiments of the present invention may include multiple rack members positioned against each side wall of the container to form a center aisle from which users may access the lockable doors of the p.o. boxes held by said rack members. Each of said rack members may be secured against a side wall of the container via a locking mechanism. When mail is delivered, an authorized user may unlock a locking mechanism against one of the side walls, thereby freeing one or more of the rack members secured against that side wall to be moved into the center aisle such that the authorized user may access the open ends of the p.o. boxes in the rear of said one or more rack members.

While intermodal containers are available in multiple sizes, according to an exemplary embodiment of the present invention, a portable post office may be housed within a corrugated steel container having dimensions of 8 feet wide by 20 feet long by 8.5 feet high, though other lengths may be selected depending upon the number of p.o. boxes necessary for a given deployment. Thus, said embodiment of the present invention can be transported via flatbed truck as a single unit to a deployment site. Certain embodiments of the present invention may further include corrugated steel doors fitted at one end of the intermodal container that remain closed during transport of the portable post office to a deployment site in order to protect the contents therein. Once placed at a deployment site, said corrugated steel doors may be left open to reveal an entryway, such as a glass door, into the post office. Embodiments of the present invention may further include a landing adjacent to said entryway level with the floor of said container, and an accessibility ramp configured to allow a wheeled device, such as a wheelchair, to be steered from ground level, up the ramp to the landing, then through the entryway into the post office. Said landing and ramp may be further configured to be stored inside the portable post office, such as in the center aisle, when not in use. Thus, certain embodiments of the present invention can be installed at a deployment site in a matter of hours, requiring only that the container be placed, opened, and the landing and ramp removed from the interior of the container and affixed in place, with no costly or labor-intensive construction required compared to portable post offices contained within double-wide trailers. Further, the corrugated steel exterior of certain embodiments of the present invention offers superior durability compared to double-wide trailer structures, thereby requiring less maintenance and repair.

Other embodiments of the present invention may further include a power system configured to deliver electricity to certain components of the portable post office, such as interior lighting, air conditioning, and one or more electrical outlets. Said power system may derive its electricity via any method suitable for a portable structure, including, but not limited to, one or more solar panels attached to the roof of the portable post office, or from a portable gas-powered generator. Said power system may further include one or more batteries, and a power converter for supplying appropriate voltage to said lighting, air conditioning, or outlets included in certain embodiments of the present invention.

DETAILED DESCRIPTION

Figure 1:
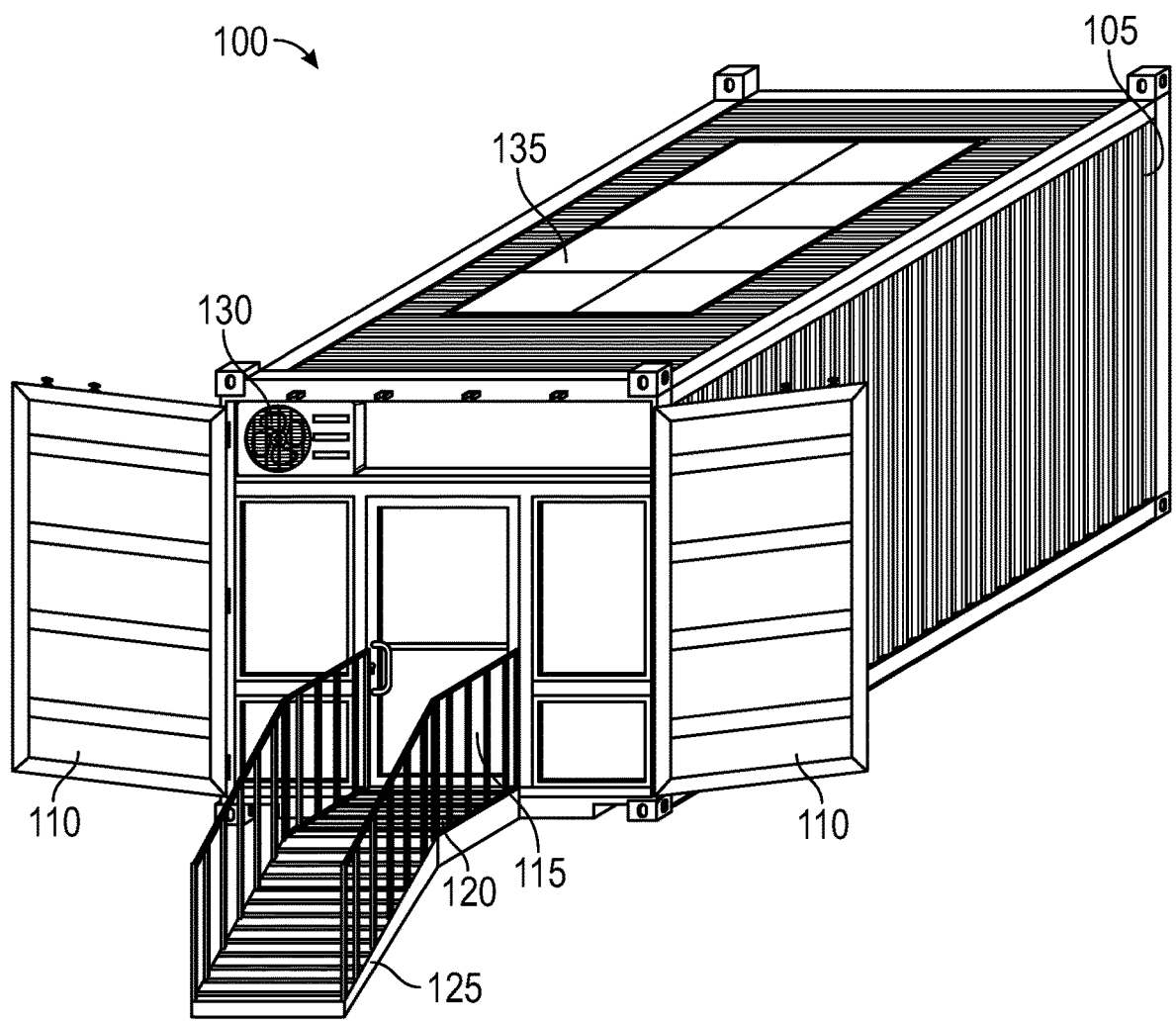
FIG. 1 is a front perspective view of portable post office, according to an exemplary embodiment of the present invention.

Embodiments of the present invention provide a portable post office configured to be employed as a single unit and contained entirely within an intermodal shipping container. Such structures may be configured to be deployed in an area where postal services have been interrupted, such as after a natural disaster that destroyed or damaged a local post office and/or multiple delivery addresses. Such structures may be configured to be readied for use with minimal labor and no extra construction materials. Thus, in certain embodiments, after placement at the desired location, the intermodal container doors may be opened to reveal an entryway into the portable post office. Said entrance may be made primarily of glass or other such transparent or translucent material to allow natural light into the structure, and to allow the interior to be viewed from the exterior. With the floor of intermodal container being approximately six inches off the ground, certain embodiments may further include a landing attached to the exterior of the entrance, and an accessibility ramp attached to said landing as to allow a wheeled device or vehicle to enter the portable post office through the entrance. When not in use, such as during transport, said landing and said accessibility ramp may be stored inside of the portable post office in the center aisle.

The interior of certain embodiments of the present invention may include a center aisle flanked by one or more rack members against the left side and right side walls. Each of the one or more rack members may be movably secured to a track member mounted to the ceiling of the portable post office via a trolley or other such rolling device configured to allow said rack member to be moved along said track member. Said track member may be mounted perpendicular to said left side and right side walls such that a rack member movably secured to said track member may be moved into the center aisle. Each rack member may be configured to hold a plurality of p.o. boxes, each having a lockable door of facing the center aisle, and an open end opposite said lockable door. Said p.o. boxes may be provided with certain embodiments of the present invention, or p.o. boxes from a damaged local post office may be moved into said rack members upon deployment of the structure.

A user may enter the portable post office via the entrance, which opens into the center aisle. The user may then locate the appropriate p.o. box and access the contents therein via the corresponding lockable door. During normal operation of the portable post office, said rack member may be secured against the left side or right side walls via a locking mechanism such that the open sides of the p.o. boxes cannot be accessed. When mail is delivered, an authorized user, such as a postal worker, may unlock the locking mechanism and move one or more rack members into the central aisle along the track member to which it is movably secured, such that said authorized user may then access the open sides of the p.o. boxes via the rear of the rack member for the purpose of delivering mail to said p.o. boxes without having to unlock each individual p.o. box.

Because certain embodiments of the present invention may be deployed into areas where other services, such as electricity, may have been interrupted or are otherwise not available, some embodiments may further include a power system configured to supply electricity to such features as interior lighting, air conditioning, and/or one or more interior electrical outlets. Such a power system may be configured to receive electricity from a primary power supply, which may be a solar panel, which may be mounted to the roof of the intermodal container, a portable electric generator positioned nearby the portable post office, or from local electrical services, should such service be available. Said power system may further include a power converter configured to convert electricity received from the aforementioned sources into the voltages and AC frequencies appropriate for such features as an air conditioner, interior lighting, or an interior electrical outlet. For example, said power converter may be configured to allow a 220 volt air conditioner to be power from a 110 volt generator. Said power system may further include one or more rechargeable battery packs configured to deliver electricity to said features when the primary power supply is not available.

Figure 2A:
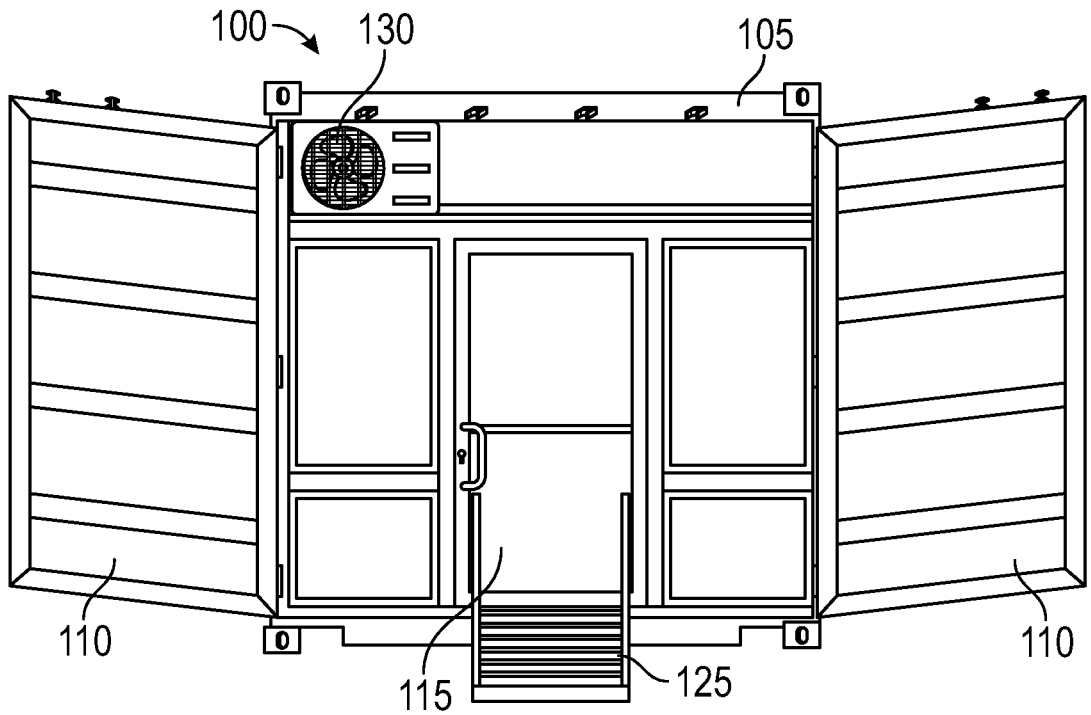
FIG. 2a is a front view of a portable post office, according to an exemplary embodiment of the present invention.
Figure 2B:
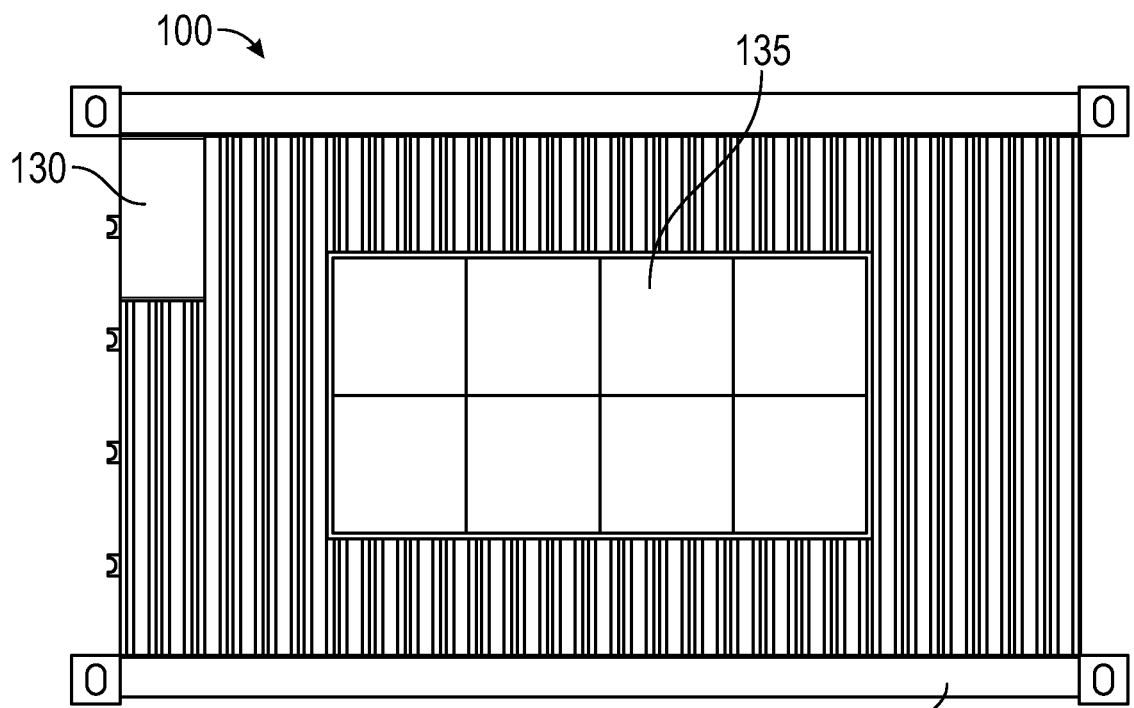
FIG. 2b is a top view of a portable post office, according to an exemplary embodiment of the present invention.

FIG. 1, FIG. 2A, and FIG. 2B are a front perspective view, a front view, and a top view, respectively, of portable post office 100, according to an exemplary embodiment of the present invention. Post office 100 may be entirely contained within intermodal container 105 having container doors 110 at one end of said container. Users may enter post office 100 via entrance 115, which may be made of glass or other transparent or translucent material to allow natural light and visibility into portable post office 100. In certain embodiments, entrance 115 may be a single door, a double door, and may include sidelights. When it is desirable to protect entrance 115 from damage, such as during transport or when post office 100 is not in use, container doors 110 may be closed and secured. Landing 120 and accessibility ramp 125 may be installed adjacent to entrance 115 upon deployment of post office 100 and are configured to allow a wheeled device, such as a wheelchair, to enter post office 100 through entrance 115. Landing 120 and ramp 125 may be made of aluminum, steel, or other suitable material, and may be configured to be stored within container 105 when not in use, such as during transport. Certain embodiments of the present invention may also include an air conditioner having condenser 130, which may be configured to draw in external air via an air intake and to deliver cool air to the interior of the post office 100 via an evaporator/vent located within the structure. Said air conditioner may receive electricity from a power system supplied by solar panel 135. Said power system may be further configured to deliver electricity to other internal components, such as lighting and an electrical outlet.

Figure 3:
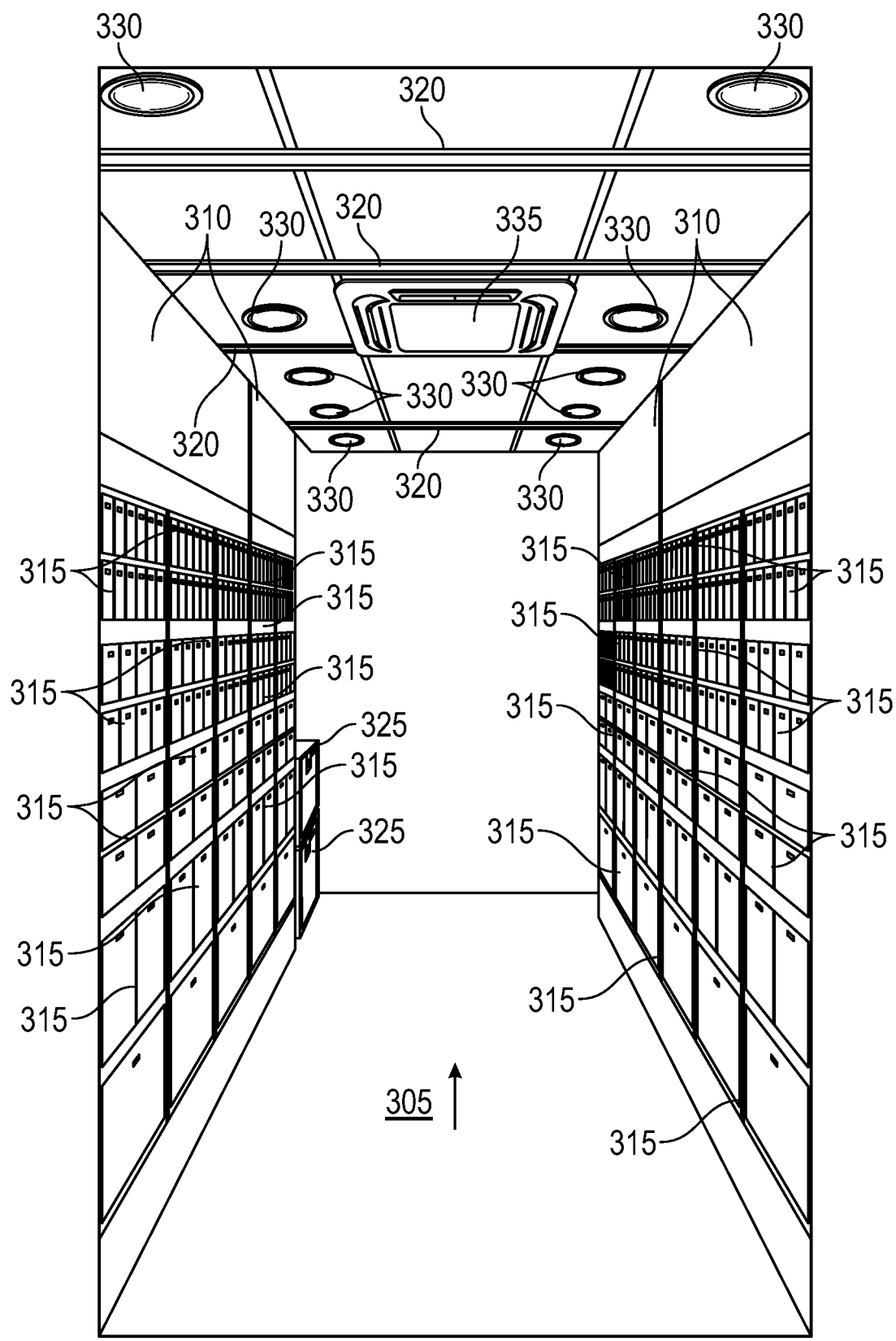
FIG. 3 is a front view of the interior of a portable post office, according to an exemplary embodiment of the present invention.

FIG. 3 is a front view of the interior of a portable post office 300 contained inside an intermodal container, according to an exemplary embodiment of the present invention. The interior of post office 300 may have center aisle 305, with one or more rack members 310 against the left side and right side walls of post office 300. Each rack member 310 may be configured to hold a plurality of p.o. boxes 315 positioned such that the lockable door of each p.o. box 315 faces center aisle 305. Each rack member 310 may be movably secured to one or more track members 320 via a trolley and configured such that rack member 310 may be moved along the one or more track members 320 into center aisle 305. Certain embodiments of the present invention may further include a power system, which may include rechargeable backup batteries 325. Said power system may be configured to supply electricity to interior lights 330, and an air conditioner having vent 335. Some embodiments of the present invention may include a landing adjacent to the entrance to post office 300, as well as an accessibility ramp affixed to said landing as to provide a way for wheeled devices, such as a wheel chair, to access the interior of post office 300. When not in use, such as during transportation, said landing and ramp may be configured to be stored in center aisle 305 until needed.

Figure 4A:
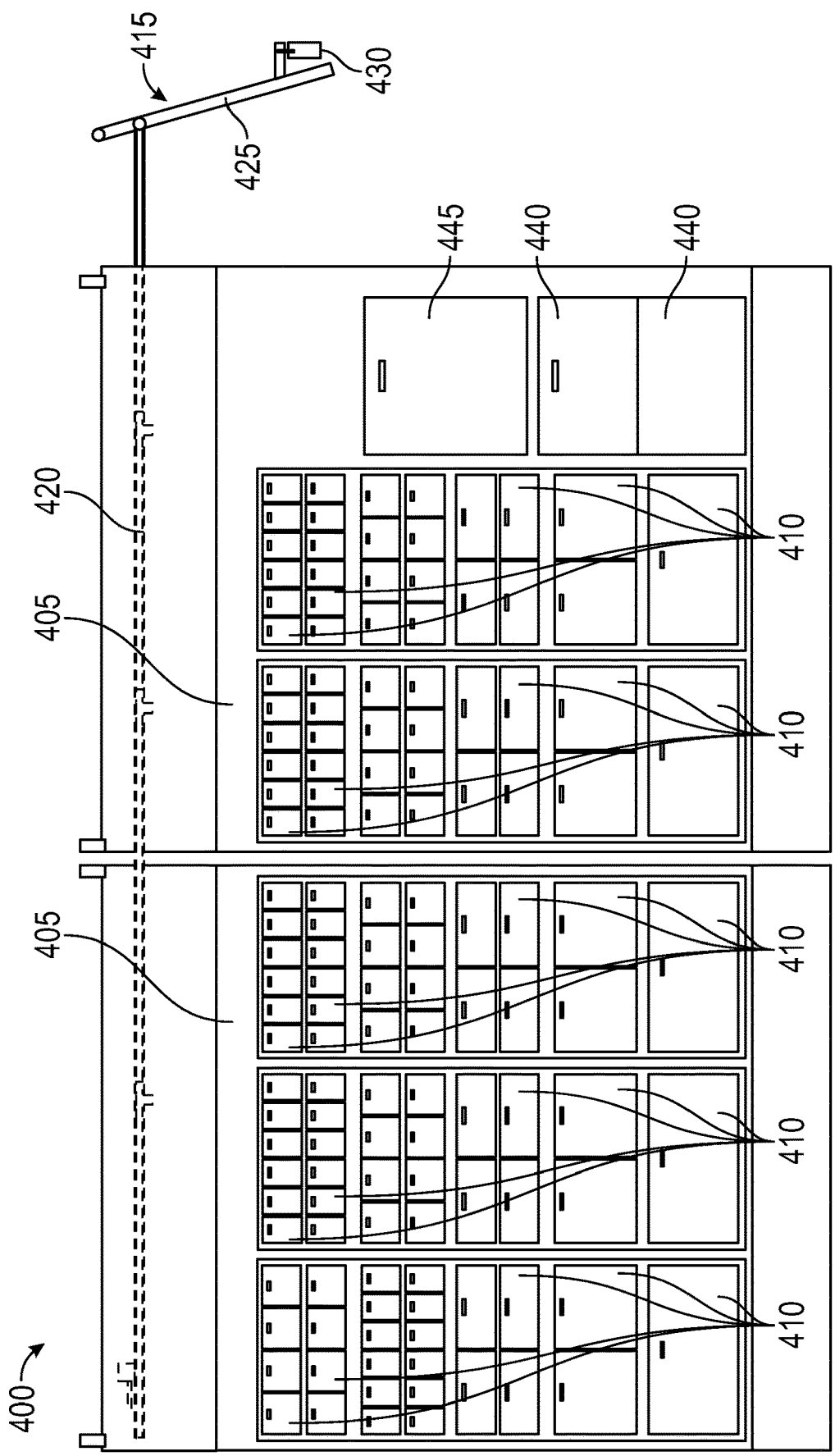
FIG. 4a is a left side view of the interior of a portable post office, according to an exemplary embodiment of the present invention.
Figure 4B:
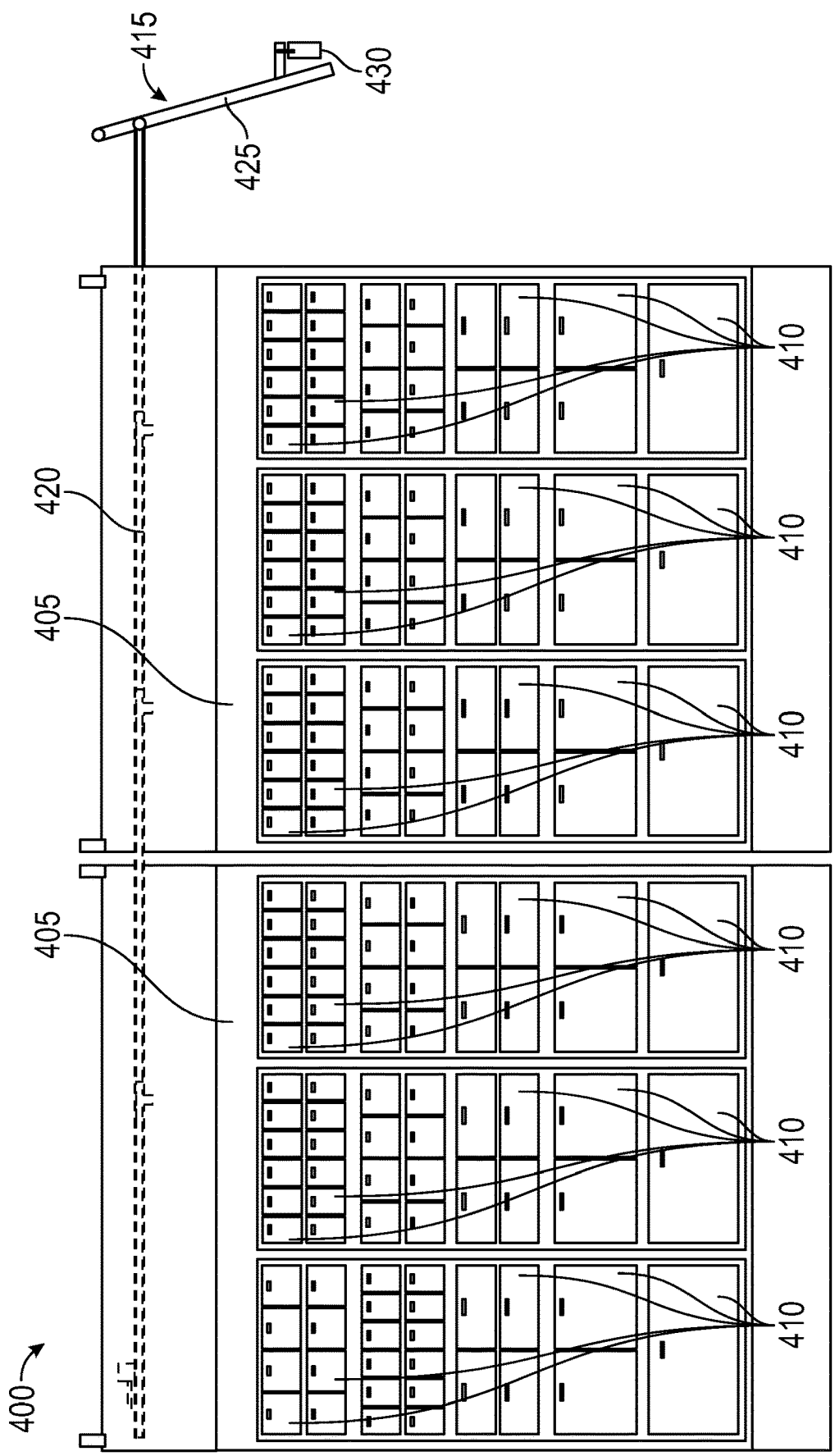
FIG. 4b is a right side view of the interior of a portable post office, according to an exemplary embodiment of the present invention.

FIG. 4A is a left side view of the interior of a portable post office 400, and FIG. 4B is a right side view of the interior of a portable post office 400, according to an exemplary embodiment of the present invention. Each of the left side and the right side of post office 400 may have one or more rack members 405 configured to hold a plurality of p.o. boxes 410. P.O. boxes 410 may be all of a uniform size, or may be different sizes to accommodate different sizes of mail or packages, depending on the needs of the p.o. box users. Each of the one or more rack members 405 may be secured to the left side wall or the right side wall by locking mechanism 415. Locking mechanism 415 may include a horizontal member 420 movably secured to either said left side wall or said right side wall and configured to slide horizontally against said side wall into a first position and a second position. Locking mechanism 415 may further include a handle member 425 by which a user may slide member 420 horizontally against said left side wall or said right side wall into said first position and said second position. In said first position, a hook member positioned on horizontal member 420 may be configured to engage with a loop member on the rear of rack member 405 such that rack member 405 is secured against the side wall to which horizontal member 420 is movably secured. In said second position, said hook member may disengage from said loop member. Said locking mechanism 415 may also include lock 430, which may be configured to secure said locking mechanism 415 in place, thereby preventing a user from sliding horizontal member 420.

Figure 5:
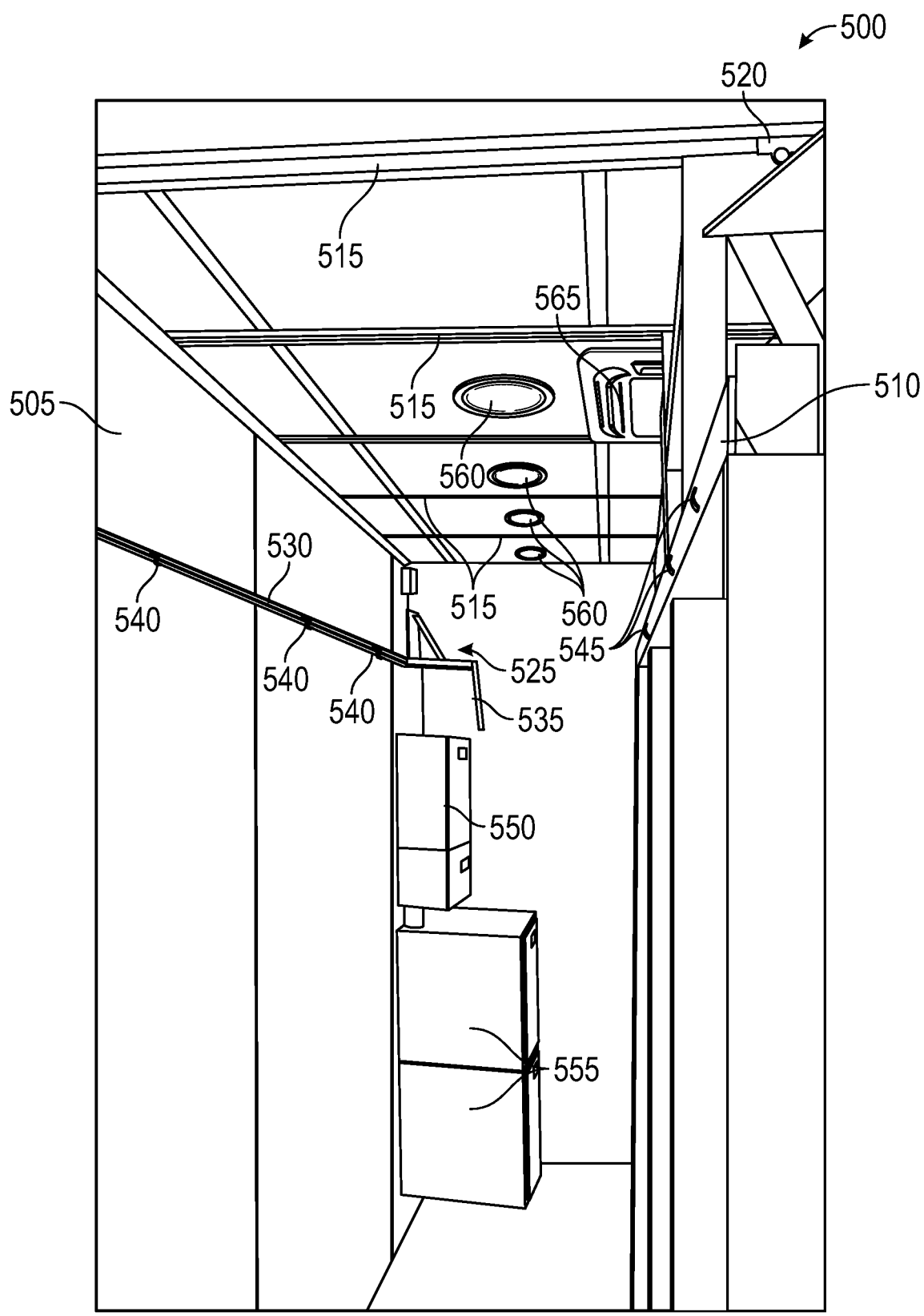
FIG. 5 is a front perspective view of the interior of a portable post office, according to an exemplary embodiment of the present invention.

FIG. 5 is a front perspective view of the interior of a portable post office 500, having side wall 505, according to an exemplary embodiment of the present invention. Side wall 505 may be a left side wall or a right side wall of post office 500. Rack member 510 may be configured to hold a plurality of p.o. boxes, each p.o. box having an open end opposite a lockable door, wherein said p.o. boxes are positioned such that said open ends face side wall 505. Rack member 510 may be movably secured to at least one track member 515 via trolley 520 such that said rack may be positioned against side wall 505, or pulled away from side wall 505 along track member 515 such that an authorized user may access the rear of rack member 510 in order to place deliveries, such as mail, to said plurality of p.o. boxes via the open ends facing side wall 505. When positioned against side wall 505, rack member 510 may be secured against side wall 505 with locking mechanism 525. Locking mechanism 525 may have a horizontal member 530 movably secured against side wall 505, and handle member 535 with which a user may slide horizontal member 530 horizontally against side wall 505 into a first position and a second position. In said first position, one or more hook members 540 mounted to horizontal member 530 may be configured to engage one or more corresponding loop members 545 mounted to the rear of rack member 510. Thus, in said first position, rack member 510 is secured against side wall 505 and cannot be moved along track members 515. In said second position, said horizontal member 530 is configured such that said one or more hook members 540 are configured to disengage from said one or more corresponding loop members 545, thereby freeing rack member 510 to move along track members 515. As previously discussed, certain embodiments of the present invention may further include a power system having power converter 550 and at least one back up battery 555. Said power converter 550 may be configured to convert electricity from an electrical source to a suitable voltage and frequency for at least one of an internal light 560, an air conditioner having vent 565, or an internal electrical outlet, such as a standard 120 volt or 110 volt outlet. In some embodiments, said air conditioner may further include a thermostat mounted to an interior wall of post office 500.

Figure 6:
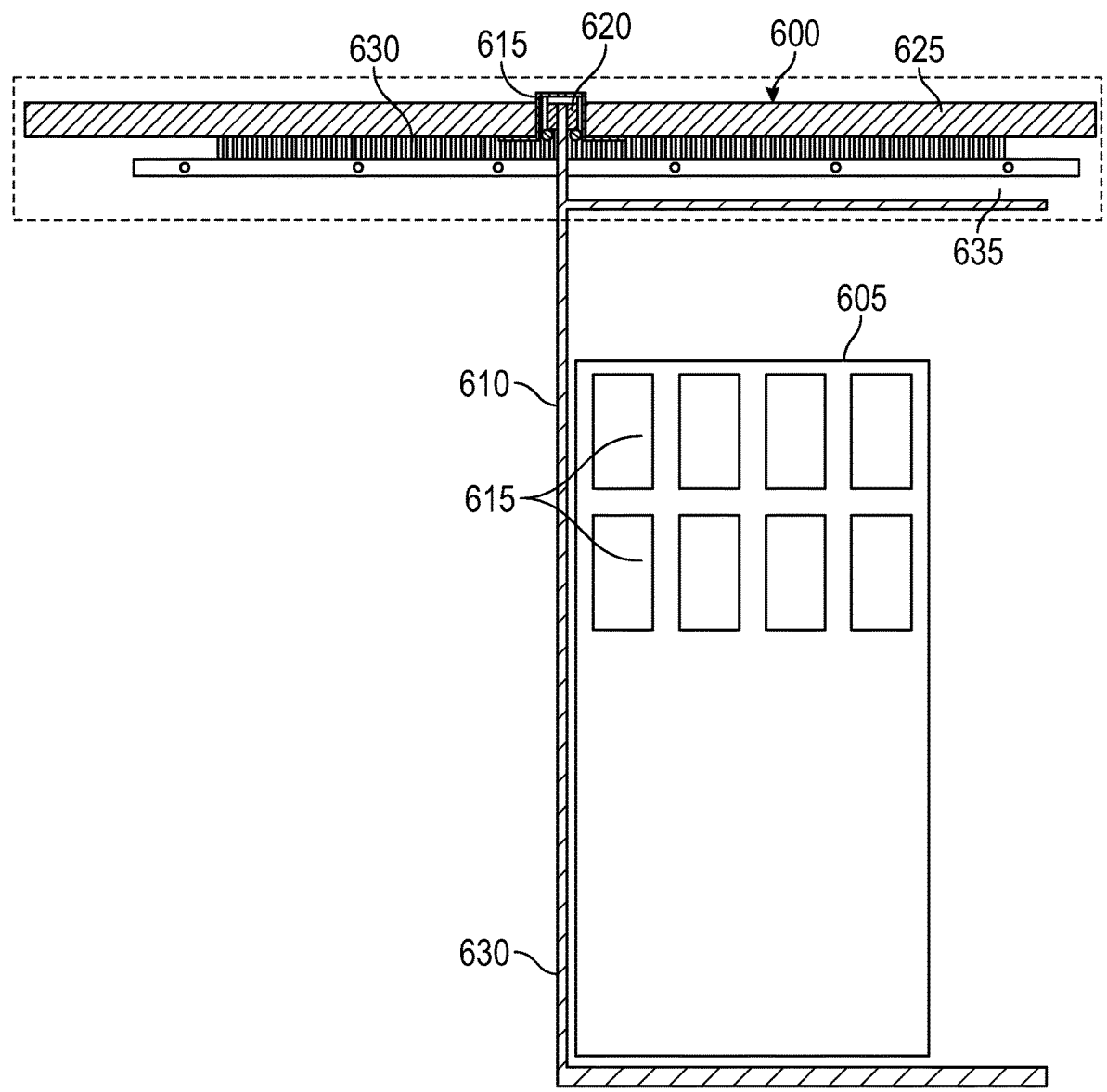
FIG. 6 is a front view of a rack member of a portable post office, according to an exemplary embodiment of the present invention.

FIG. 6 is a front view of a rack member 605 mounted inside a portable post office 600, according to an exemplary embodiment of the present invention. Rack member 605 may include a frame member 610 by which rack member 605 is movably secured to track member 615 via a trolley 620. In some embodiments of the present invention, track member 615 may be a Unistrut track, such as a 1⅝", 12 gauge Unistrut track secured in a formed "HAT" wall angle mounted to the interior ceiling of post office 600. In some embodiments, said trolley 620 may be a Unistrut Trolley #P2950 rated for at least 600 pounds. Some embodiments may movably secure rack member 605 to track member 615 via two trolley members 620. Said track member 615 may be mounted or otherwise affixed to the ceiling of the interior of post office 600. Some embodiments may further include ceiling material 625, such as acoustical ceiling material or panels, such that track 615 appears to be mounted flush with the ceiling of post office 600. Certain embodiments may further include weather stripping 630 at the top and/or bottom of rack member 605, which weather stripping may be a brush seal or other such material configured to prevent the entry of debris to the area behind rack member 605. Finally, some embodiments of the present invention may also include soffit 635 between the plurality of p.o. boxes 615 and weather stripping 630 to cover frame member 610. Soffit member 635 may be configured to prevent access to frame member 610, to prevent the introduction of debris to the area behind rack member 605, and to achieve an aesthetically pleasing, "finished" look to rack member 605. Soffit member 635 may be made of plywood, metal, plastic, vinyl, or other such suitable materials.

Figure 7:
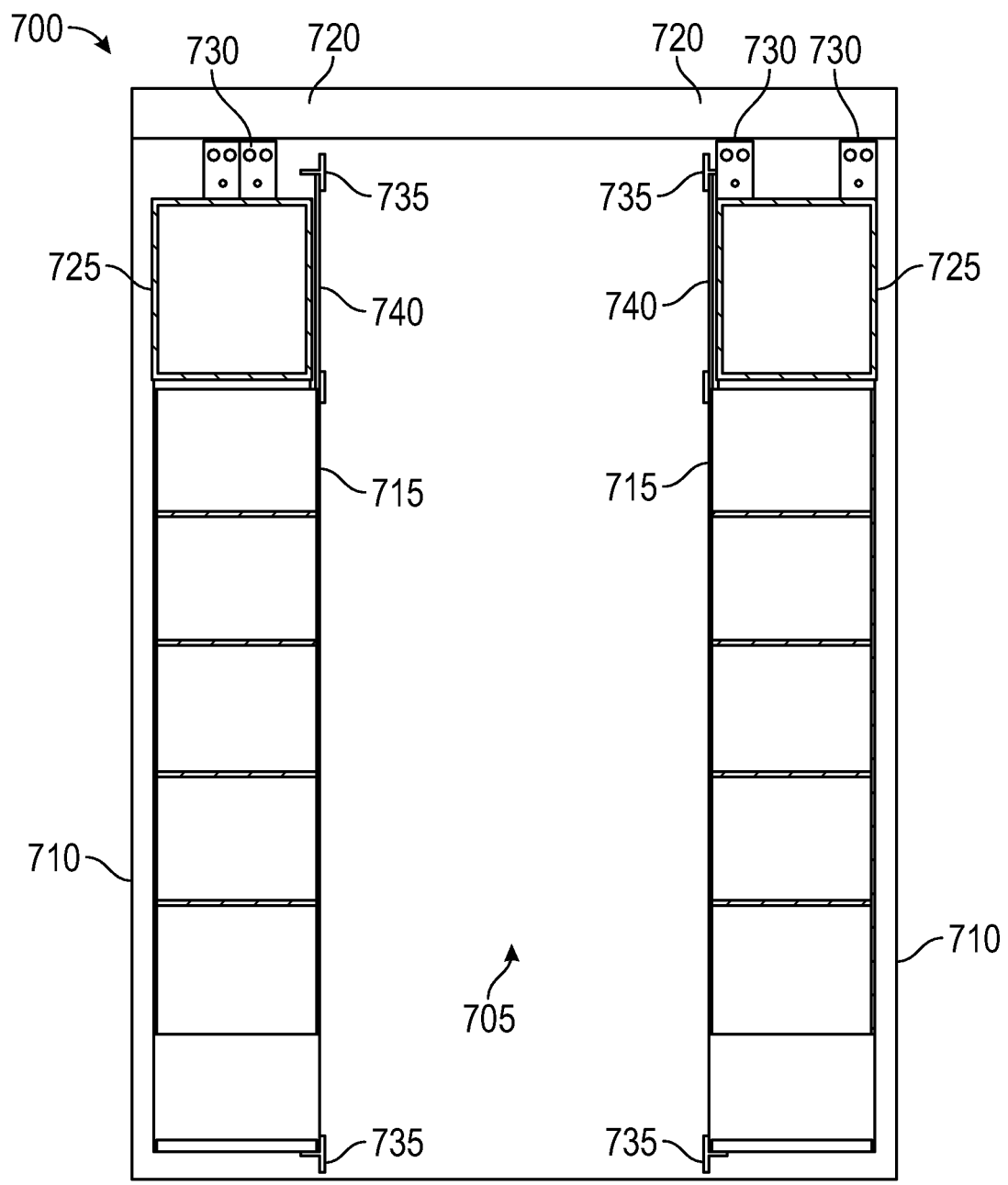
FIG. 7 is a front, cross-section view of the interior of a portable post office, according to an exemplary embodiment of the present invention.

FIG. 7 is a front, cross-section view of the interior of a portable post office 700, according to an exemplary embodiment of the present invention. Portable post office 700 may include center aisle 705 with at least one rack member 715 on each of the left and right side walls 710, wherein each rack member 715 is configured to hold a plurality of p.o. boxes, each p.o. box having a lockable door facing center aisle 705 and an open end opposite said door facing side wall 710. Rack member 715 may further include frame member 725 by which rack member 715 is movably secured to track member 720 via trolley 730. Track member 720 may be mounted or affixed to the interior ceiling of post office 700 perpendicular to side walls 710. According to certain embodiments, each rack member 715 may be movably secured to track member 720 by at least two trolleys 730. Rack member 710 may be configured to slide along said track member 720 so that it can be moved from a position against side wall 710 to a position in center aisle 705, and back again. Some embodiments of the present invention may further include weather stripping 735, which may be a brush stripping, and soffit 740.

Figure 8:
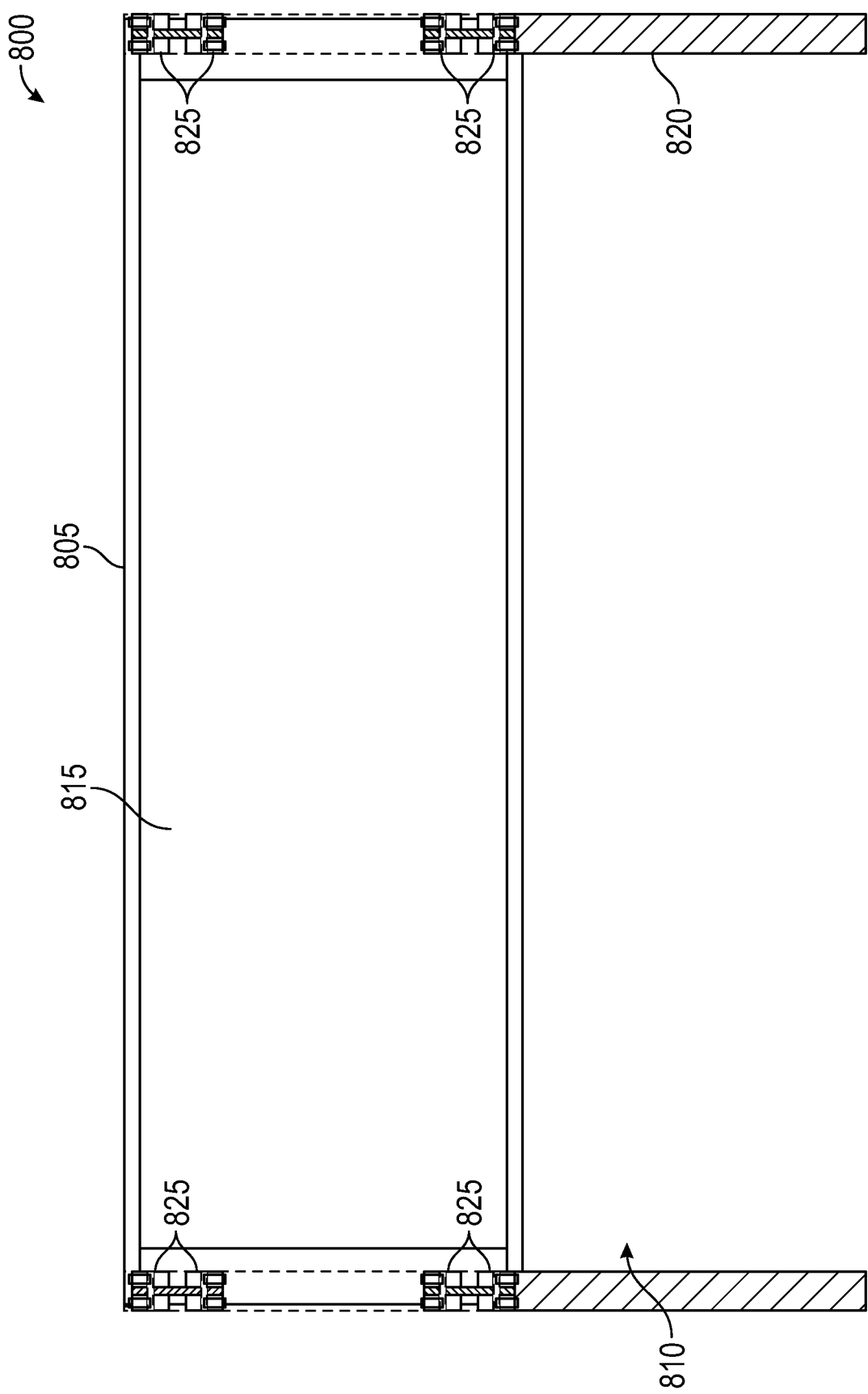
FIG. 8 is a top view of a rack member in the interior of a portable post office, according to an exemplary embodiment of the present invention.

FIG. 8 is a top view of the interior of a portable post office 800, according to an exemplary embodiment of the present invention. Post office 800 may include side wall 805, center aisle 810, and rack member 815. Rack member may be further configured to hold a plurality of p.o. boxes, each p.o.

box having a lockable door facing center aisle 810 and an open end opposite said door facing side wall 805. Rack member 815 may be movably secured to track member 820 via trolleys 825. Track member 820 may be mounted to the interior ceiling of post office 800 perpendicular to side wall 805. Thus, rack member 815 may be configured to travel along track member 820 from a first position against side wall 805 to a second position within center aisle 810. When said rack member is in said first position, a user may access their individual assigned p.o. box via center aisle 810, from which they may unlock said box to retrieve any contents therein. When mail is delivered, an authorized individual, such as a postal worker, may move rack member 815 along track member 820 to said second position within center aisle 810 such that said authorized individual may access the open ends of the plurality of p.o. boxes via the rear of rack member 815 in order to deliver mail, packages, or other materials to said p.o. boxes without having to unlock individual boxes from center aisle 810. Said authorized individual may then return rack member 815 to said first position against side wall 805.

Figure 9A:
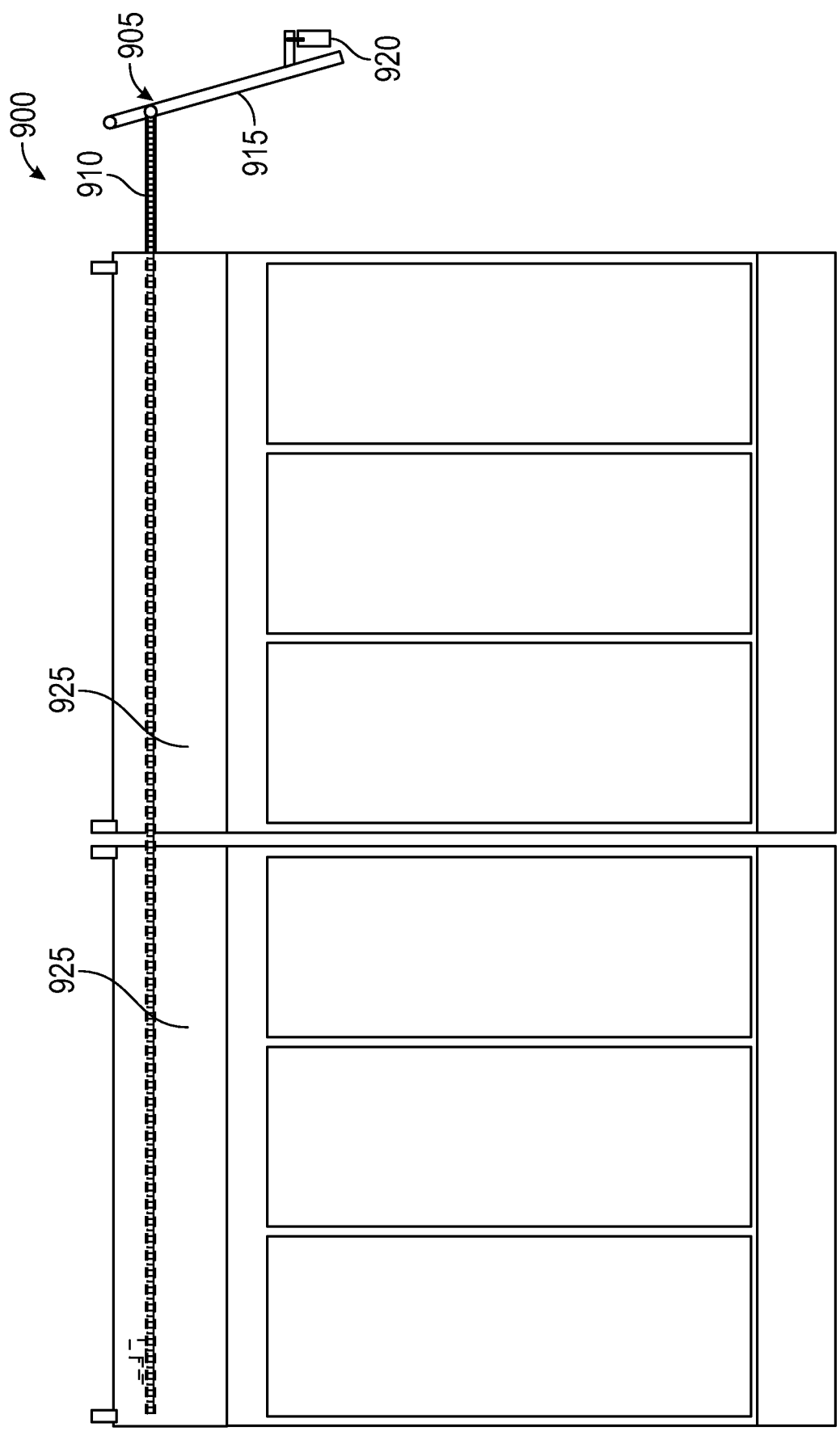
FIG. 9a is a left side view of the interior of a portable post office, according to an exemplary embodiment of the present invention.

FIG. 9a is a side view of the interior of a portable post office 900 having locking mechanism 905, according to an exemplary embodiment of the present invention. Locking mechanism 905 is configured to secure one or more rack members 925 to a side wall of post office 900. As discussed above, in certain embodiments of the present invention, rack member 925 may be movably secured to a track mounted to the ceiling of post office 900 such that rack member 925 may be positioned against a side wall of post office 900 or moved along said track to a center aisle of post office 900 to allow access to the rear of said rack member 925 for delivery of mail to p.o. boxes mounted within rack member 925. Locking mechanism 905 may thus be configured to secure rack member 925 against said side wall to prevent unauthorized access to the unsecured openings of said p.o. boxes, which may be positioned to face the side wall of post office 900. Said locking mechanism 905 may further include horizontal member 910, which may be movably affixed to a side wall of post office 900 to allow for limited horizontal sliding movement against said side wall of post office 900. Locking mechanism 905 may further include handle member 915, by which a user may slide horizontal member 910 horizontally against said side wall. Finally, locking mechanism 905 may be further configured to be affixed to a side wall of post office 900 via lock 920, thereby preventing the aforementioned horizontal movement of horizontal member 910 until lock 920 is removed. As will be demonstrated in subsequent figures, horizontal member 910 may include one or more hook members configured to engage with one or more corresponding loop members affixed to the rear of rack member 925 such that when said hook members are engaged with said loop members, rack member 925 is prevented from moving along said track and is instead affixed to said side wall of the post office 900.

Figure 9B:
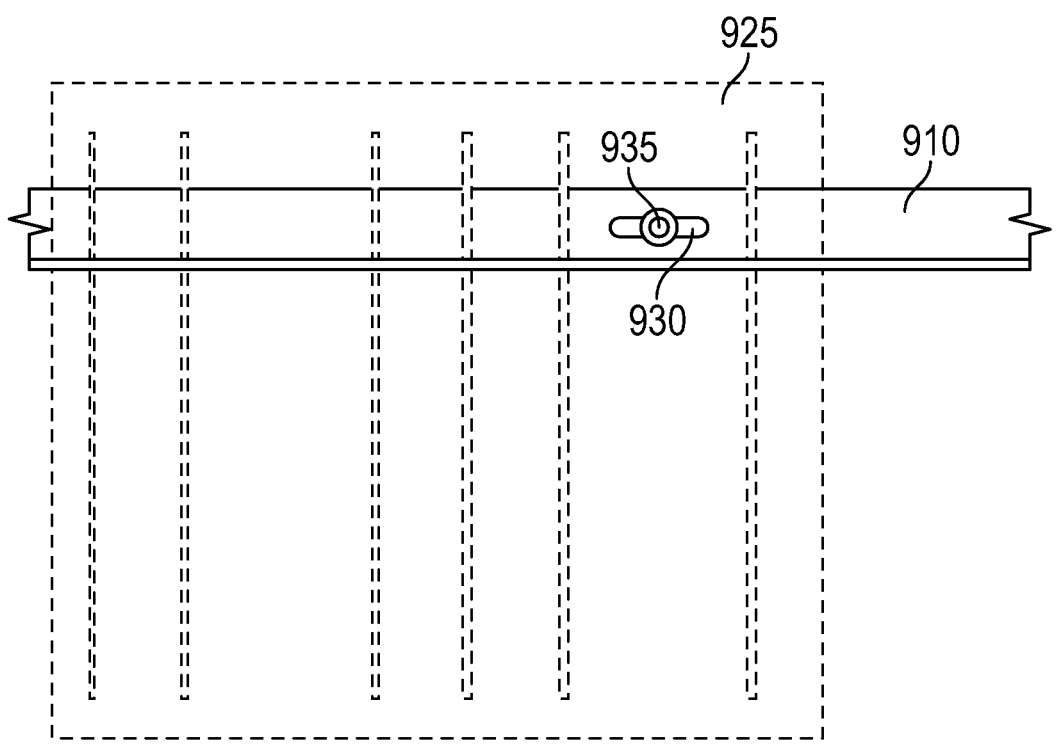
FIG. 9b is a left side view of a portion of a locking mechanism for a portable post office, according to an exemplary embodiment of the present invention.

FIG. 9b is a close-up side view of a portion of a horizontal member 910 of locking mechanism 905 for portable post office 900, according to an exemplary embodiment of the present invention. A portion of horizontal member 910 may extend behind rack member 925 along a side wall of post office 900. Horizontal member 910 may be affixed to a side wall of post office 900 via slot 930 which is configured to engage with bolt 935, which is welded, mounted, or otherwise affixed to a side wall of post office 900. Thus, while horizontal member 910 is affixed to said side wall via bolt 935, slot 930, which may be shaped as an elongated oval, nevertheless allows horizontal member 910 to move horizontally along said side wall for a length equal to the horizontal length of slot 930. For example, in certain embodiments of the present invention, horizontal member 910 may be a steel sliding angle having dimensions 2×2× ⅛", slot 930 may be a ½×2" slot, and bolt 935 may be a ⅜×2", grade 5 bolt. Some embodiments of the present invention may include multiple slots 930 along the length of horizontal member 910 configured to engage with corresponding bolts 935 affixed to the side wall of post office 900. In such embodiments, slots 930 and corresponding bolts 935 may be positioned 3 feet on center. Finally, locking mechanism 905 may further include handle member 915, which may allow a user to slide horizontal member 910 horizontally along said side wall of post office 900 for a distance equal to the length of slot 935.

Figure 10A:
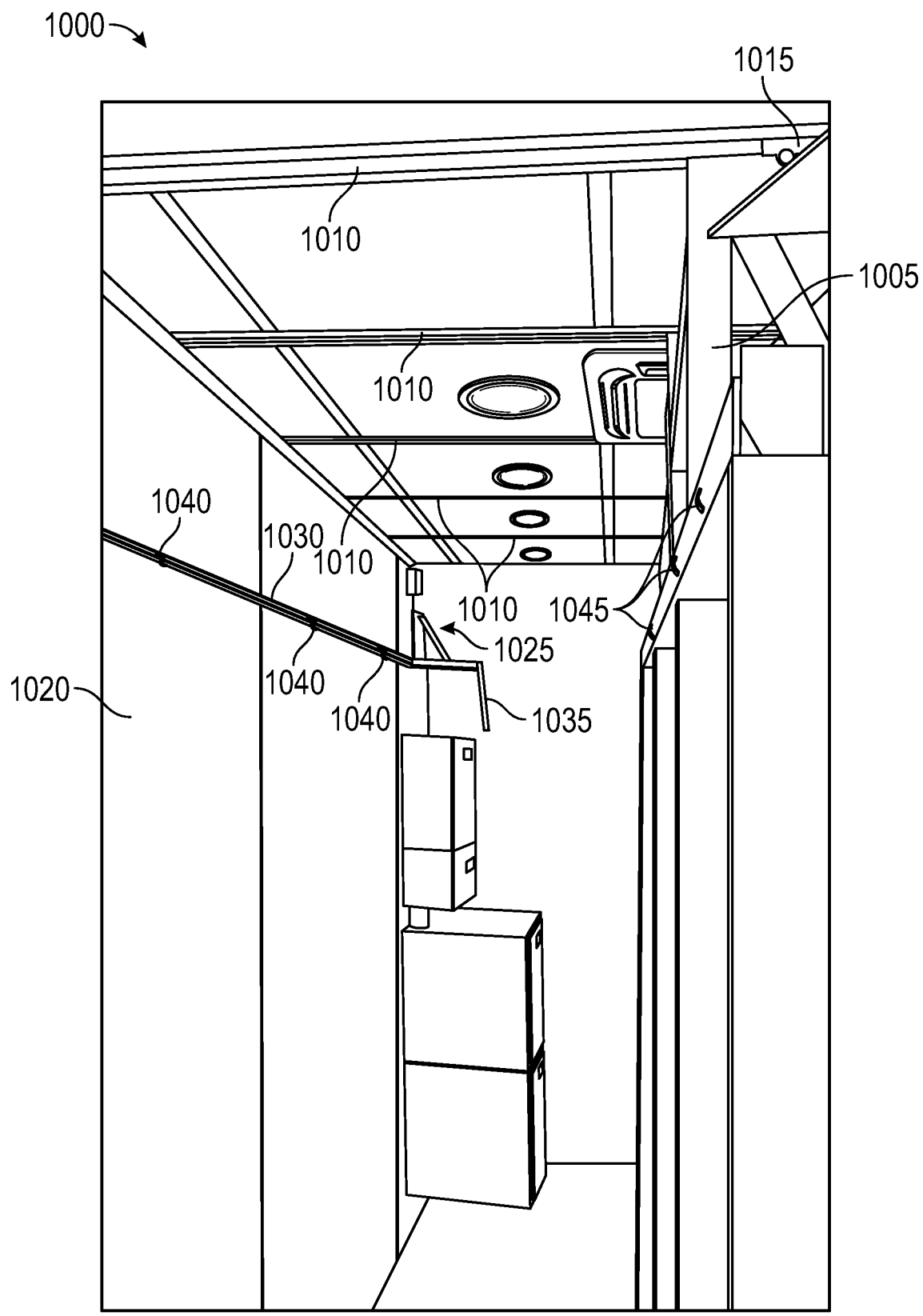
FIG. 10a is a front perspective view of the left portion of a portable post office, according to an exemplary embodiment of the present invention.

FIG. 10a is a front perspective view of the left portion of a portable post office 1000, according to an exemplary embodiment of the present invention. Rack member 1005, which may be configured to hold a plurality of p.o. boxes having lockable doors facing a center aisle of post office 1000 and open ends opposite said lockable doors facing side wall 1020, may be movably secured to at least one track member 1010 via at least one trolley 1015. Thus, rack member 1005 may be moved along track 1010 from a first position against side wall 1020 to a second position in said center aisle of said post office 1000, such that an authorized user, such as a postal worker, may access the rear of rack member 1005 to deliver mail, packages, or other items to said plurality of p.o. boxes via said open ends. To prevent unauthorized access to the rear of rack member 1005, rack member 1005 may be secured to side wall 1020 via locking mechanism 1035 in certain embodiments of the present invention.

Accordingly, locking mechanism may include horizontal member 1030 movably affixed to side wall 1020 such that it may be moved horizontally along side wall 1020 between a first position and a second position via handle member 1035. In said first position, at least one hook member 1040 affixed to horizontal member 1030 may be configured to engage with a corresponding loop member 1045 affixed to the rear of rack member 1005. Thus, in said first position, the engagement of hook member 1040 with loop member 1045 prevents rack member 1005 from moving along track member 1010, thereby securing rack member 1005 against side wall 1020. When horizontal member 1030 is moved horizontally to said second position via handle member 1035, hook member 1040 disengages from loop member 1045, thereby releasing rack member 1005 from side wall 1020 and allowing rack member 1005 to move along track member 1010.

Figure 10B:
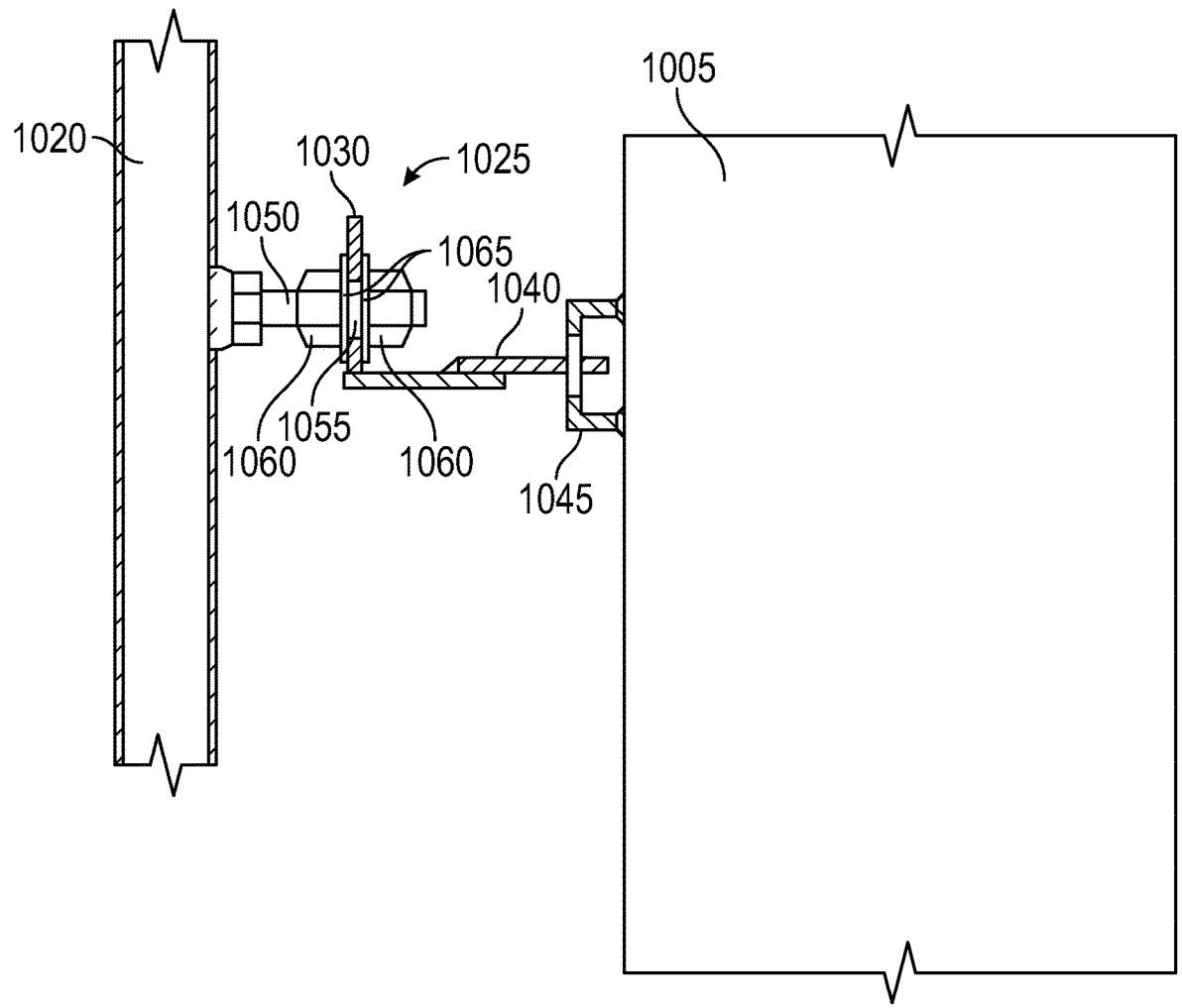
FIG. 10b is a front view of a portion of a locking mechanism for a portable post office, according to an exemplary embodiment of the present invention.
Figure 10C:
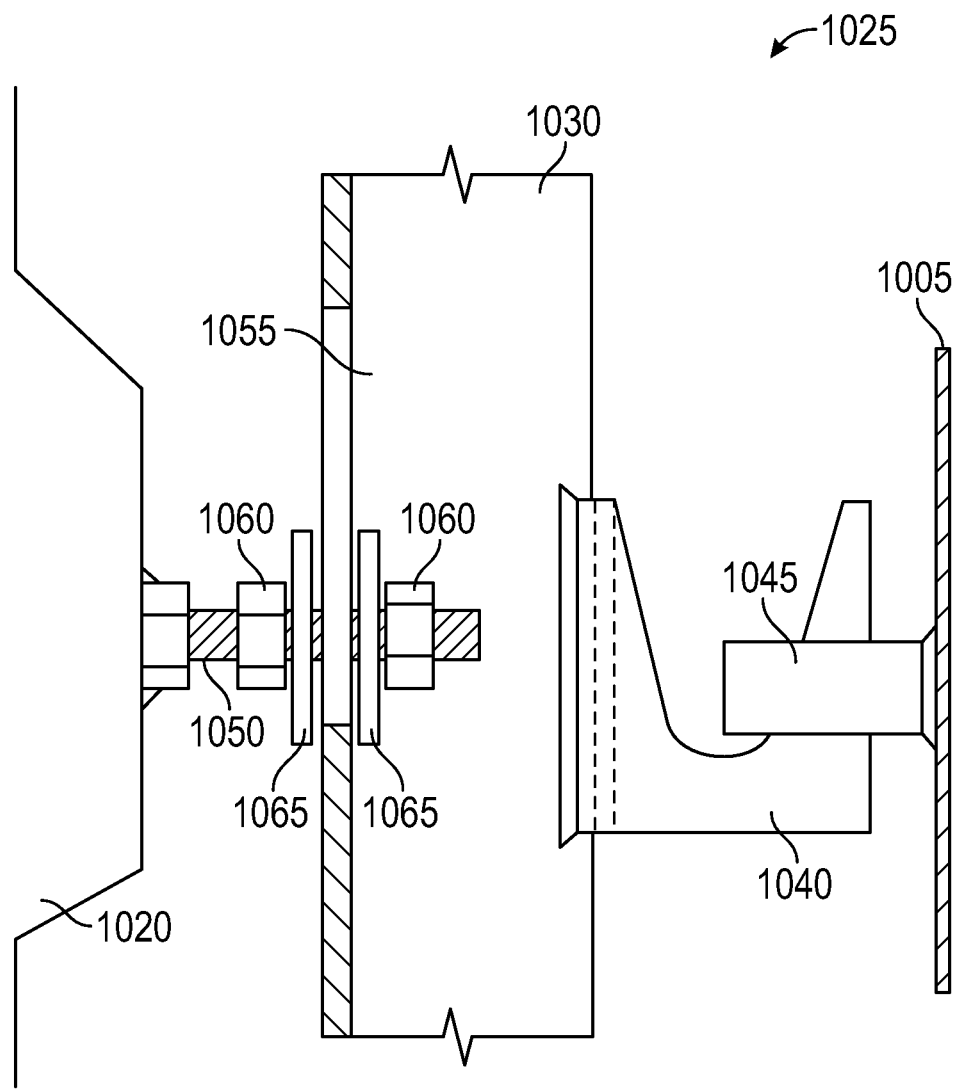
FIG. 10c is a bottom view of a portion of a locking mechanism for a portable post office, according to an exemplary embodiment of the present invention.

FIGS. 10b and 10c are a front view and a bottom view, respectively, of a portion of locking mechanism 1025 for portable post office 1000, according to an exemplary embodiment of the present invention. Horizontal member 1030 is movably secured to side wall 1020 via slot 1055, which may be configured to receive bolt 1050, which may be welded, mounted, or otherwise affixed to side wall 1020. Slot 1055 may be configured as an elongated, horizontal oval, thereby allowing limited movement of horizontal member 1030 along the length of slot 1055, such that horizontal member 1030 may be moved into said first position and said second position. Horizontal member 1030 may be further affixed to bolt member 1050 through slot 1055 by a combination of threaded bolts 1060 and washers 1065. Thus, in some embodiments of the present invention, threaded bolts 1060 may be positioned along bolt 1050 on either side of horizontal member 1030, with washers 1065 acting as spacers between threaded bolts 1060 and horizontal member 1030. Thus, horizontal member 1030 may be affixed to bolt 1050 while still allowing horizontal movement along the length of slot 1055. In certain embodiments of the present invention, horizontal member 1030 may be a steel sliding angle having dimensions 2×2×⅛", slot 1055 may be a ½×2" slot, and bolt 1050 may be a ⅜×2", grade 5 bolt.

In said first position, loop member 1045, mounted to the rear of rack member 1005, is configured to receive hook member 1040, mounted to horizontal member 1030. Thus, in said first position, rack member is secured to side wall 1020 and cannot be moved along track member 1010. When horizontal member 1030 of locking mechanism 1025 is moved into said second position, hook member 1040 is configured to disengage from loop member 1045, thereby releasing rack member 1005 from side wall 1020. Rack member 1005 is thus free to move along track 1010.

Figure 10D:
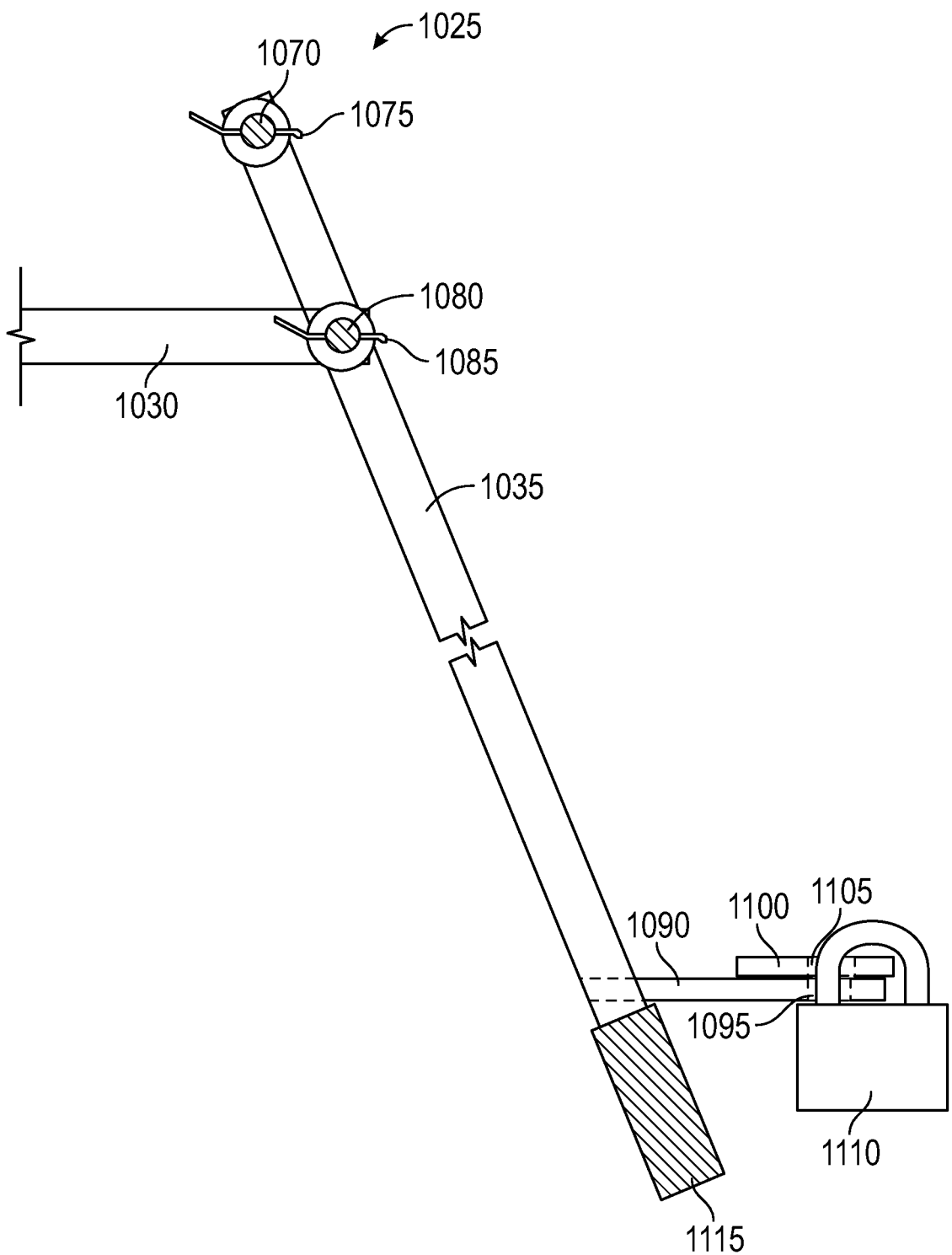
FIG. 10d is a left side view of a portion of a locking mechanism for a portable post office, according to an exemplary embodiment of the present invention.

FIG. 10*d* is a side view of a portion of locking mechanism 1025 for portable post office 1000, according to an exemplary embodiment of the present invention. Handle member 1035 may be configured to allow a user to slide horizontal member 1030 horizontally against side wall 1020 for a length equal to the length of slot 1055 in order to move said horizontal member 1030 between said first position and said second position. Handle member 1035 may be mounted or affixed to side wall 1020 via pivot 1070. Pivot 1070 may be welded, mounted, or otherwise affixed to side wall 1020, and handle member 1035 may be affixed to pivot 1070 via pin 1075. Thus, handle member 1035 may be configured to rotate about pivot 1070. Handle member 1035 may be affixed to horizontal member 1030 via pivot 1080. Pivot 1080 may be welded, mounted, or otherwise affixed to horizontal member 1030, and handle member 1035 may be affixed to pivot 1080 via pin 1085. Thus, in order to slide horizontal member 1030 between said first position and said second position, a user may rotate handle member 1035 back and fourth about pivot 1070 such that horizontal member 1030 moves along the length of slot 1055.

Locking mechanism 1025 may further include a first plate 1090 having hole 1095, which may be welded, mounted, or otherwise affixed to handle member 1035, and a second plate 1100 having hole 1105, which may be welded, mounted, or otherwise affixed to side wall 1020. Said first plate 1090 and said second plate 1100 may be configured such that when horizontal member 1030 is in said first position, wherein hook member 1040 is engaged with loop member 1045, first plate 1090 contacts second plate 1100 such that holes 1095 and 1105 are concentrically aligned, thereby allowing the shackle of pad lock 1110 to pass through holes 1095 and 1105. Thus, when said horizontal member 1030 is in said first position, locking mechanism 1025 can be secured in place via pad lock 1110, thereby preventing rotation of handle member 1035 and thus securing rack member 1005 against side wall 1020 such that rack member 1005 cannot be moved along track member 1010. Only when pad lock 1110 is removed from holes 1095 and 1105 can handle 1035 be rotated in a clockwise direction such that horizontal member 1030 can be moved into said second position, thereby disengaging hook member 1040 from loop member 1045 and thus freeing rack member 1005 for movement along track member 1010. In certain embodiments of the present invention, pivots 1070 and 1080 may be ½" pivots, and pins 1075 and 1085 may be ⅛" Cotter pins. In further embodiments, handle member 1035 may be ¾" diameter schedule 40 pipe, first plate 1090 and second plate 1100 may be ¼" thick metal plates, and holes 1095 and 1105 may be ⅝" diameter holes. In some embodiments, handle member 1035 may further include grip 1115 at the opposite end of handle member 1035 from pivot 1070. Grip 1115 may be rubber, plastic, or other suitable material, and configured to allow a user to grasp handle member 1035 with a hand for rotation about pivot 1070.

While the embodiments of the present invention are described herein with reference to various implementations and exploitations, it will be understood that these embodiments are illustrative and that the scope of the invention(s) is not limited to them. In general, embodiments of a portable post office as described herein may be implemented using devices and materials consistent with any appropriate desired structure. Many variations, modifications, additions, and improvements are possible.

For example, plural instances may be provided for components, operations, or structures described herein as a single instance. Boundaries between various components, operations, and functionality are depicted somewhat arbitrarily, and particular operations are illustrated within the context of specific illustrative configurations. For example, certain drawings contained herein illustrate particular arrangements of p.o. boxes mounted within rack members according to certain embodiments of the present invention. But these arrangements are for illustrative purposes only, and the present invention is in no way limited to said arrangements. P.O. Boxes are available in multiple sizes, and the present invention is intended to cover any arrangement and/or configuration of as may be required for a given deployment of a portable post office according to the present invention. In general, structures presented as separate components in the exemplary configurations may be implemented as a combined structure. Similarly, structures presented as a single component may be implemented as separate components or steps. These and other variations, modifications, additions, and improvements may fall within the scope of the inventive subject matter. While certain embodiments of the present invention reference the invention as a portable post office configured for use in an area affected by a natural disaster (and therefore in need of a temporary post office) it will be understood that the present invention is not limited to such deployments, but may also implemented anywhere where postal services are needed and cannot be provided by conventional means, such as in a rural area without a brick-and-mortar local post office to provide p.o. boxes for area residents.

What is claimed is:

1. A portable post office, comprising:
   a portable container having a left side wall, a right side wall, a top wall having an inner surface and an outer surface, a front wall, a rear wall, and a center aisle between said left wall and said right wall and below said inner surface of said top wall;
   a door through said front wall configured to allow ingress to and egress from said post office;
   a track member attached to said inner surface of said top wall such that said track member is perpendicular to said left side wall and said right side wall;
   a rack member movably secured to said track member by a trolley and having a front side facing said center aisle and a back side opposite said front side; and
   a locking mechanism,
   wherein said rack member comprises a plurality of boxes, each box having a lockable door facing said center aisle and an open side opposite said lockable door;
   wherein said rack member is mounted with said back side facing said left side wall and configured to move along said track member via said trolley such that said rack member can be positioned against said left side wall or moved away from said left side wall into said center aisle; and wherein said locking mechanism is configured to secure said rack member against said left side wall such that a person cannot access said open sides of the plurality of boxes.

2. The portable post office of claim 1, wherein said locking mechanism further comprises:
a sliding member horizontally mounted to said left side wall;
a hook member mounted to said sliding member; and
a loop member mounted to said back side of said rack member and configured to receive said hook member,
wherein said sliding member is configured to move horizontally into a first position such that said hook member engages said loop member thereby securing said rack member in place against said left side wall and thereby preventing said rack member from moving along said track member; and
wherein said sliding member is configured to move horizontally into a second position such that said hook member disengages from said loop member thereby allowing said rack member to be moved along said track member.

3. The portable post office of claim 2, wherein said locking mechanism further comprises:
a handle member attached to said sliding member;
a first plate mounted to said handle member and having a first hole;
a second plate mounted to said left side wall and having a second hole; and
a padlock having a shackle,
wherein said handle member is configured to allow a user to horizontally move said sliding member between said first position and said second position; and
wherein said first plate and said second plate are configured such that when said sliding member is in said first position, said first hole and said second hole align concentrically such that the shackle of said padlock can be passed through said first hole and said second hole and said padlock can be locked, thereby preventing said sliding member from being moved out of said first position.

4. The portable post office of claim 3, further comprising:
a removable landing attached to exterior of said front wall; and
a removable ramp extending from ground level to the level of said landing,
wherein said landing and said ramp are configured to allow a wheeled device to access said door from ground level; and
wherein said landing and said ramp are configured to be removed and stored in said center aisle when not in use.

5. The portable post office of claim 4, further comprising:
a solar panel; and
a power converter,
wherein said solar panel is mounted to the outer surface of said top wall and configured to deliver electricity to said power converter; and
wherein said power converter is configured to deliver electricity to at least one of: a light, an air-conditioner, or an electrical outlet.

6. The portable post office of claim 5, further comprising:
a light mounted to said top wall,
wherein said power converter is configured to supply electricity to said light.

7. The portable post office of claim 5, further comprising:
an air conditioner,
wherein said air conditioner is configured to regulate the interior temperature of the post office; and
wherein said power converter is configured to supply electricity to said air conditioner.

8. The portable post office of claim 5, further comprising:
an air conditioner,
wherein said air conditioner is configured to regulate the interior temperature of the post office; and
wherein said power converter is configured to supply electricity to said air conditioner.

9. A portable post office, comprising:
a portable container having a left side wall, a right side wall, a top wall having an inner surface and an outer surface, a front wall, a rear wall, and a center aisle between said left wall and said right wall and below said inner surface of said top wall;
a door through said front wall configured to allow ingress to and egress from said post office;
a track member attached to said inner surface of said top wall such that said track member is perpendicular to said left side wall and said right side wall;
a rack member movably secured to said track member by a trolley and having a front side facing said center aisle and a back side opposite said front side; and
a locking mechanism,
wherein said rack member comprises a plurality of boxes, each box having a lockable door facing said center aisle and an open side opposite said lockable door;
wherein said rack member is mounted with said back side facing said right side wall and configured to move along said track member via said trolley such that said rack member can be positioned against said right side wall or moved away from said right side wall into said center aisle; and
wherein said locking mechanism is configured to secure said rack member against said right side wall such that a person cannot access said open sides of the plurality of boxes.

10. The portable post office of claim 9, wherein said locking mechanism further comprises:
a sliding member horizontally mounted to said right side wall;
a hook member mounted to said sliding member; and
a loop member mounted to said back side of said rack member and configured to receive said hook member,
wherein said sliding member is configured to move horizontally into a first position such that said hook member engages said loop member thereby securing said rack member in place against said right side wall and thereby preventing said rack member from moving along said track member; and
wherein said sliding member is configured to move horizontally into a second position such that said hook member disengages from said loop member thereby allowing said rack member to be moved along said track member.

11. The portable post office of claim 10, wherein said locking mechanism further comprises:
a handle member attached to said sliding member;
a first plate mounted to said handle member and having a first hole;

a second plate mounted to said right side wall and having a second hole; and a padlock having a shackle, wherein said handle member is configured to allow a user to horizontally move said sliding member between said first position and said second position; and wherein said first plate and said second plate are configured such that when said sliding member is in said first position, said first hole and said second hole align concentrically such that the shackle of said padlock can be passed through said first hole and said second hole and said padlock can be locked, thereby preventing said sliding member from being moved out of said first position.

12. The portable post office of claim 11, further comprising:

a removable landing attached to exterior of said front wall; and a removable ramp extending from ground level to the level of said landing, wherein said landing and said ramp are configured to allow a wheeled device to access said door from ground level; and wherein said landing and said ramp are configured to be removed and stored in said center aisle when not in use.

13. The portable post office of claim 12, further comprising:

a solar panel; and a power converter, wherein said solar panel is mounted to the outer surface of said top wall and configured to deliver electricity to said power converter; and wherein said power converter is configured to deliver electricity to at least one of: a light, an air-conditioner, or an outlet.

14. The portable post office of claim 13, further comprising:

a light mounted to said top wall, wherein said power converter is configured to supply electricity to said light.

15. The portable post office of claim 14, further comprising:

an air conditioner, wherein said air conditioner is configured to regulate the interior temperature of the post office; and wherein said power converter is configured to supply electricity to said air conditioner.

16. The portable post office of claim 15, further comprising:

an electrical outlet, wherein said power converter is configured to supply electricity to said electrical outlet.

* * * * *